US006506824B1

(12) United States Patent
Bastioli et al.

(10) Patent No.: US 6,506,824 B1
(45) Date of Patent: *Jan. 14, 2003

(54) THERMOPLASTIC COMPOSITIONS COMPRISING STARCH AND OTHER COMPONENTS FROM NATURAL ORIGIN

(75) Inventors: Catia Bastioli, Novara (IT); Vittorio Bellotti, Fontaneto d'Agogna (IT); Roberto Lombi, Novara (IT); Gabriele Perego, Ivrea (IT)

(73) Assignee: Novamont S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,076

(22) Filed: Oct. 17, 1997

Related U.S. Application Data

(63) Continuation of application No. 08/583,875, filed on Jan. 11, 1996, now abandoned.

(30) Foreign Application Priority Data

Jan. 10, 1995 (IT) ........................................ MI95A0023

(51) Int. Cl.[7] ............................ C08L 3/02; C08L 3/06; C08L 3/08; C08L 1/08

(52) U.S. Cl. ............................ 524/47; 524/37; 524/38; 524/39; 524/40; 524/41; 524/42; 524/43; 524/44; 524/45; 524/46; 524/50; 524/51; 523/128

(58) Field of Search ............................ 524/35, 36, 37, 524/38, 39, 40, 41, 42, 43, 44, 45, 46, 47, 50, 51; 523/124, 128

(56) References Cited

U.S. PATENT DOCUMENTS 5,280,055 A * 1/1994 Tomka ........................ 524/47
5,500,465 A * 3/1996 Krishnan et al. ............. 524/35

* cited by examiner

*Primary Examiner*—Peter Szekely
(74) *Attorney, Agent, or Firm*—Brian Cave LLP

(57) ABSTRACT

Biodegradable thermoplastic compositions comprising a starch component, a cellulose ester or ether, a plasticizer for the starchy phase and of the cellulose and derivatives, and a compatibilizer agent selected from polymers compatible with the cellulose and or starchy component, grafted with aliphatic or polyhydroxilated chains; copolymers obtained from hydroxy acids and/or diamines with 2–24C and aliphatic or aromatic diisocyanates; copolymers obtained from aliphatic polyesters, polyureas and polyalkylene glycols and aliphatic or aromatic diisocyanates; copolymers obtained from polymers compatible with cellulose ester or ethers and/or the starchy component by grafting starch soluble polyols; polymer capable of complexing starch; starch compatible polyols.

12 Claims, No Drawings

THERMOPLASTIC COMPOSITIONS COMPRISING STARCH AND OTHER COMPONENTS FROM NATURAL ORIGIN

This is a continuation of U.S. application Ser. No. 08/583,875, filed Jan. 11, 1996, now abandoned.

The present invention relates to biodegradable thermoplastic composition suitable, in particular for preparing injection moulded articles free from surface defects, comprising a starchy component and a cellulose ester or ether.

Biodegradable composition obtained starting from starch and a thermoplastic polymer are well known in the art and available from the market and are disclosed, e. g., in European patent applications EPA 32 802, 327 505, 400 532, 404 723, 404 727, 404 728, and in W090/0671, W071/02025, U.S. Pat. No. 5,095,054.

Typically, such compositions can be obtained by blending starch and a synthetic thermoplastic polymer, under extrusion cooking conditions, i.e. in the presence of limited amounts: of water (generally 0.5–40% by weight based on starch-water system) or of a plasticiser, by operating under temperature and pressure conditions sufficient to destroy the starch crystallinity and to obtain a thermoplastic molten mass (destructured starch).

From European patent application EPA 575 349, biodegradable compositions are known which comprise a starch component and a cellulose ester.

The injection moulded articles obtained starting from said compositions are affected from the drawback of displaying unpleasant surface scale due to the poor compatibility between starch and cellulose esters. European patent application EPA 542 155 discloses compositions based on starch and cellulose esters added with a compatibilizer agent (epoxidized soy bean oil and acetylated starch) in order to confer improved mechanical properties to the moulded articles. The moulded articles from the above compositions undergo considerable delamination phenomena due to the insufficient compatibilization between starch and the cellulose ester.

We have found now that it is possible to improve the mutual compatibility of starch or starch esters or ethers and cellulose esters or ethers and to obtain moulded articles free from scales unevenness, by using selected classes of compatibilizing agents.

Beside endowing the resulting compositions with better homogeneity, the use of the compatibilizing agents of the invention improves the biodegradability characteristics of the compositions.

The compositions according to the present invention comprise:

- starch or a starch ester or ether with a substitution degree from about 1.2 to 2.5;
- a cellulose ester or ether with a substitution degree from about 1.2 to 2.5;
- a plasticizer for the starchy phase and a plasticizer for the cellulose derivatives phase or a plasticizer for both phases;
- a compatibilizing agent selected from the following classes:
  - (A) polymers compatible with cellulose esters or ethers and/or starch or starch esters and ethers, grafted with aliphatic or polyhydroxylated chains containing from 4 to 40 carbon atoms;
  - (B) copolymers obtained from hydroxy acids and/or diamines with 2–24 carbon atoms and aliphatic or aromatic diisocyanates or epoxy compounds and anhydrides; copolymers obtained from aliphatic polyesters, polyamides or polyureas and aliphatic or aromatic diisocyanates; copolymers obtained from aliphatic or aromatic diisocyanates and polyalkylene glycols;
  - (C) copolymers obtained from polymers compatible with cellulose esters or ethers and/or starch or starch esters or ethers, by grafting starch soluble polyols or structures capable of complexing starch.
  - (D) polymers capable of complexing starch such as ethylene—vinyl alcohol or ethylene acrylic acid copolymers, aliphatic polyesters or polyamides.
  - (E) starch compatible polyols selected from the monomers and the low molecular weight polyols (Viscosity average molecular weight lower than 10,000) such as glycerol, sorbitol, erythritol, polyglycerol, dextrines, polyvinylalcohol, polyaspartates, and the above polyols grafted with alkylenoxides or polyalkylenoxides. The compatibilizer agents indicated under (A) are obtained by grafting aliphatic chains with 4–40 carbon atoms optionally containing up to three unsaturations and or heteroatoms or still other functional groups, to polymers compatible with cellulose esters or cellulose ethers. Preferably, the chains derive from animal or vegetable fats, such as oleic, lauric, myristic, palmitic, stearic, euric, linoleic, ricinoleic acids or phospholipids with terminal end groups which allow the chains to be grafted to the polymers compatible with cellulose esters or ethers.

The terminal group can be carboxy, ester or salt groups; the chains can also be modified in order to obtain terminal groups such as alcohol, aldehyde, amine, amide, acid chloride, isocyanate, mercaptan epoxy and anhydride groups. The polymers to which the above said lipidic chains are grafted can display different degrees of affinity with cellulose derivatives and starch esters or ether; some of them can even be miscible with said cellulose derivatives and starch ester or ethers; others, with a lower compatibility degree, can anyway result to be interesting because they can be easily transformed into compatible derivatives.

Such polymers can be of either natural or synthetic origin. Furthermore, they can be used as such, or modified or depolymerized to trimer level by hydrolysis, saponification, cracking or by means of enzymatic reactions.

Examples of the above polymers are:

- (a) cellulose esters with various DS (Degree of Substitution);
- (b) cellulose ethers with various DS;
- (c) cellulose ethers/esters with various DS values;
- (d) starch ester with various DS values, as acetates;
- (e) starch ethers with various DS values, such as the reaction products of starch with ethylene or propylene glycols;
- (f) starch ethers/esters with various DS values;
- (g) partially hydrolysed polyvinyl acetate;
- (h) aliphatic polyesters and copolyesters, optionally also grafted with those products as listed under (a)–(g) above. In this case, polymers are preferred which are obtained by grafting low molecular weight(350–1000) polycaprolactone (PCL) to polyvinyl alcohol copolymer or, also, by grafting PCL to regenerated cellulose or starch;
- (i) aliphatic/aromatic or aromatic copolyesters optionally grafted with above (a)–(g) products;
- (j) polymers from natural origin such as cellulose, hemicellulose, lignin, cellulose ethers and xanthates, regenerate cellulose, pullulan, chitin, chitosan,pectins, proteins, vegetable and animal gelatines, zein, gluten, casein, albumen, natural or modified rubbers, alginates, rosin derivatives.

The aliphatic chains can be grafted by means of any known type of reaction, and generally by:

(1) transesterification of ester group;

(2) esterification of hydroxy groups;

(3) urethanizing hydroxy groups by means of isocyanates;

(4) epoxidizing hydroxy groups with aliphatic epoxides;

(5) acetilization of hydroxy groups with aliphatic aldehydes.

The compatible polymers with the cellulose derivatives and starch esters or ethers, polyols soluble in starch, or capable of complexing starch, can be grafted for example with following polyols: modified amylose and its hydrolysis product; polyvinyl alcohol with various hydrolysis degrees, ethylene-vinyl alcohol copolymers, polyols of glycerol, polyglycerol, saccharides, oligosaccharides, trimethylol propane, pentaerythritol.

The number of grafted chains are comprised within the range of from 0.1 to 30 grafted chains per each 100 monomeric units in the polymer chain, preferably from 0.2 to 20, and still more preferably, from 0.3 to 10 grafted chains for each 100 monomeric units.

Besides the compatibilizers of above (A) type which require that polymeric products are modified by grafting lipidic chains, also copolymers of above (B) type can be advantageously used, particularly those obtained from such aliphatic polyesters such as polycaprolactone with various molecular weight and polyethylene succinates, from aliphatic or aromatic diisocyanates or copolymers obtained from $C_2$–$C_{24}$ hydroxy acids, or aliphatic or aromatic diisocyanates, or copolymers of above (C) type.

For the preparation of copolymers of above (B) type, preferred diisocyanates are:

4,4'-diphenylmethane diisocyanate, hydrogenated 4,4'-diphenylmethane diisocyanate, toluidene diisocyanate, isoforone or hexamethylene-diisocyanate.

Estane (a caprolactone:urethane copolymer traded by Goodrich as "54351 grade") is a representative copolymer of (B) class.

The compositions comprise the starchy component and the cellulose derivatives in ratios by weight comprised within the range from 1:90 to 90:1, preferably from 1:40 to 40:1 and still more preferably of 1.5:5 to 1:1.5.

The compatibilizer agents are present in amounts comprised from 0.1 to 20% by weight, preferably of from 0.5 to 10%

The plasticiser for cellulose phase and the starchy phase are present in amounts respectively comprised from 5 to 40%, and still more preferably,of from 10 to 30%, by weight.

Compounds which act as plasticizers for both phases, such as, diacetins, can be used.

The total amount of plasticizer is generally comprised from 5 to 40% based on total weight of the composition, preferably from 10 to 30%.

Besides the components indicated above, the composition can also contain synthetic polymers in an amount up to about 30% by weight, preferably less than 10%.

Examples of synthetic polymers which can be used are polyvinylalcohol, polyvinyl acetate, thermoplastic polyesters, such as polycaprolactone, copolymers of caprolactone with isocyanates, polyethylene or polybutylene adipate or sebacate, lactic acid polymers.

The starch which can be used to prepare the compositions according to the present invention generally is a native starch, extracted from various plants, such as maize, potato wheat, tapioca and cereal starch. Under the term "starch" are also included high amylopectin starches ("waxy" starches), high-amylose starches, chemically and physically modified starches e.g., starches the acid number of which is reduced down to a value comprised within the range from 3 to 6; starches in which the type and concentration of cations associated with phosphate groups are modified, starch ethoxylated,starch acetates, cationic starches, hydrolysed starches, oxidized and crosslinked starches.

Representative cellulose esters comprise cellulose acetates, propionates and/or butyrates, with various degrees of substitution. Cellulose acetate with degree of substitution comprised from 1.5 to 2.5 are preferred.

Example of cellulose and starch ethers are ethyl or propyl ethers.

Cellulose esters or ethers in neat form, mainly the acetate esters, have so high processing temperature as to cause the matrix to undergo severe degradation. They require the use of a plasticizer which can be selected from:

- glycerol esters with aliphatic acids containing up to 6 carbon atoms, in particular diacetin and triacetin;
- esters of citric acid, in particular trimethyl or triethyl citrate, as well as acetyl-triethyl-citrate;
- dialkyl esters of tartaric acid;
- esters of aliphatic acids, lactones and lactides;
- dialkyl esters of aliphatic acids such as those derived from oxalic, glutaric, adipic, sebacic, suberic, azelaic acids, mainly dibutyl adipate and dibutyl sebacate;
- dialkyl esters of aromatic acids in which the alkyl group contains from 1 to 10 carbon atoms, in particular dimethyl phthalate, diethyl phthalate, methoxy and ethoxy ethyl phthalate;
- polyethylene glycol adipate, glutarate or sebacate;
- alkyl and aryl phosphates, in particular triethyl and tricresyl phosphates;
- alkyl ester or fatty acids, such as butyl oleate;
- plasticizers such as the product traded as Paraplex an epoxidized soybean oil available from Rohm and Haas; Admex 719 an epoxidized talloil available from Archer Daniels Midland; the Flexol series of 2-ethylhexyl esters of hexanediole acids from Union Carbide;
- non-bleeding plasticizers such as: mixed aliphatic-aromatic esters of trimethlyol propane and pentaerythritol; alkyl phosphate terminated polyethylene glycols.

In order to obtain the thermoplastic character of the starchy phase, in particular at low humidity contents, polar substances are added, which are capable of forming hydrogen bonds with amylose and amylopectin. Suitable substances for that purpose are polyols with 1–20 repeating hydroxylated units, each containing from 2 to 6 carbon atoms; ethers, thioethers, organic and inorganic esters, acetates and amino derivatives of the above polyols; the reaction products of the polyols with chain extenders; polyol oxidation products containing at least one aldeydic or carboxy group. Plasticizers of this type are disclosed in WO 92/19680 application.

The plasticizers disclosed in WO 92/19680 include

The plasticizers incorporated from WO 92/19680 include glycerine, polyglycerol, glycerol ethoxylate, ethylene or propylene glycol, ethylene or propylene diglycol, ethylene or propylene triglycol, polyethylene or polypropylene glycol, 1,2-propandiol, 1,3-propandiol, 1,2-butandiol, 1,3-butandiol, 1,4-butandiol, 1,5-pentandiol, 1,6-pentandiol, 1,5-hexandiol, 1,2,6- hexantriol, 1,3,5-hexantriol, neopentylglycol, trimethylolpropane, pentaerythritol, sorbitol acetate, sorbitol diacetate, sorbitol monoethoxylate, sorbitol dipropoxylate, sorbitol diethoxylate, sorbitol hexaethoxylate, aminosorbitol, trihydroxymethylaminomethane, glucose/PEG, the product of reaction of ethylene oxide with glucose, trimethylolpropane monoethoxylate, mannitol monoacetate, mannitol monoethoxylate, butyl glucoside, glucose monoethoxylate, alpha-methyl glucoside, the sodium salt of carboxymethylsorbitol, polyglycerol monoethoxylate and mixtures thereof.

Preferred plasticizers are those which act as plasticizers for both the starchy and the cellulosic phase and the acetins belong to this preferred class.

The starchy phase is normally plasticised directly during the compounding step, in mixture with all the other components. However, also a two step process can be used in which the starchy phase and the cellulosic phase are individually plasticized and/or the starchy phase is plasticized prior to the final compounding step.

Preferred plasticizers comprise: water glycerol, glycerol ethoxylate, ethylene or propyleneglycol, polyethylene glycol polypropyleneglycol, 1,2-propanediol, 1-3 propanediol, 1-2, 1,3-, 1,4-butanediol, 1,5-pentanediol, 1,6-, 1,5-hexanediol, 1,2,6, 1,3,5,-hexanetriol, neopentylglycol, sorbitol acetate, sorbitol diacetate, sorbitol monoethoxylate, sorbitol diethoxylate, trimethol propane monoethoxylate, mannitol monoacetate, mannitol monoethoxylate, butyl glucoside, glucose monoethoxylate, sodium salt of carboxymethylsorbitol, polyglycerol monoethoxylate.

The preparation of the composition according to the present invention comprises blending the components in a heated extruder or in any device which may secure temperature shear stress conditions sufficient to cause the conversion of the starchy material and the cellulose derivatives into a thermoplastic state and to render the components compatible with each other as regard their rheology, operating at a temperature comprised within the range of from 80 to 210° C. in the presence of water and a plasticizer.

The preferred method for preparing the compositions comprises:

a first step consisting in conveying the components through an extruder with residence times of the order of from 2 to 50 seconds, during which the starchy components and cellulose derivatives are caused to undergo swelling due to the action of the plasticizer and optionally added water, by operating at a temperature comprised within the range from 80 to 180° C.;

a blending step during which the mixture from the preceding step is submitted to shear stress conditions which correspond to similar viscosity values of the cellulose derivatives and the starchy components;

optionally a step of venting under controlled pressure conditions or in vacuo in order to obtain a molten mass preferably at a temperature comprised within the range from 130 to 180° C. with a water content preferably smaller than 6% such as not to have bubbles formation at atmospheric pressure, e.g., at the extruder outlet, if producing foamed products is not desired. This condition is satisfied when it is desired to obtain not foamable products.

In the case of foamable products, the water content in the blend may be as high as 20%, preferably up to 18%.

The resulting molten mass can be then directly extruded into pellets from which articles are then fabricated by means of the conventional processes.

The following examples are supplied in order to illustrate the invention without limiting it.

EXAMPLES

Examples 1–8 are comparison examples; examples 9–22 are according to the invention.

(A) Blending

The compositions were prepared by using a twin-screw APV extruder Mod. 2030 of 30 mm of diameter, with L:D=25. The temperature profile of the 16 temperature controlled zones was as follows:

60° C.×1–100° C.×1–180° C.×14

The screw revolution speed was 120 rpm.

(B) Injection Moulding

The pellets obtained form the extruder were fed to a Sandretto injection press Series 60 in order to obtain dumbbell-shaped specimens. The test results are reported in following table 1

TABLE 1

| | 1 | 2 | 3 | 4 | 5 | 6 | |
|---|---|---|---|---|---|---|---|
| Aceplast LS | 75 | 80 | 75 | 44 | 4- | 64 | |
| CAB | — | — | — | — | 44 | — | |
| Acetyl triethyl citrate | — | — | 25 | — | — | — | |
| Diacetin | 25 | — | — | — | — | — | |
| Epoxidized soy bean oil | — | — | — | 16 | 16 | — | |
| Caprolactone | — | 20 | — | — | — | 16 | |
| Mat-1 | — | — | — | — | — | 20 | |
| Mat-2 | — | — | — | — | — | — | |
| Maize Starch | — | — | — | 32 | 32 | — | |
| Acetylated starch with DS 1.3 | — | — | — | — | — | — | |
| Acetylated starch with DS 2.0 | — | — | — | — | — | — | |
| Sorbilene (ethoxilated sorbitol) | — | — | — | 7.8 | 78.8 | — | 8 |
| Erucamide | — | — | — | 0.2 | 02.2 | — | 2 |
| FOOTNOTES | a | a | a | b | a, c | a | b |

| | 12 | 13 | 14 | 15 | 16 | 17 | 18 | 19 | 20 | 21 | 22 |
|---|---|---|---|---|---|---|---|---|---|---|---|
| Aceplast LS | 44 | 44 | 44 | 44 | 44 | 44 | 44 | 44 | 38 | 38 | 45 |
| Diacetin | 16 | 16 | 16 | 16 | 16 | 16 | 16 | 16 | 14 | 14 | — |
| Maize Starch | 24 | 27 | 27 | 27 | 27 | 27 | 27 | 27 | 25 | 30 | 29 |
| Acetylated starch with DS 1.3 | — | — | — | — | — | — | — | — | 5 | — | 16.5 |

TABLE 1-continued

| | | | | | | | | | | | |
|---|---|---|---|---|---|---|---|---|---|---|---|
| Acetylated starch with DS 2.0 | — | — | — | — | — | — | — | — | — | — | — |
| Sorbilene | 7.8 | 7.8 | 7.8 | 7.8 | 7.8 | 7.8 | 7.8 | 7.8 | 7.8 | 7.8 | 8.3 |
| Eucarimide | 0.2 | 0.2 | 0.2 | 0.2 | 0.2 | 0.2 | 0.2 | 0.2 | 0.2 | 0.2 | 0.2 |
| SAc DS 1.3/laurate 0.3 | 5 | — | — | — | — | — | — | — | — | — | — |
| SAc DS 1.3/laurate 0.9 | — | 5 | — | — | — | — | — | — | — | — | — |
| SAc DS 1.3/laurate 2.2 | — | — | 5 | — | — | — | — | — | — | — | — |
| SAc DS 1.3/laurate 4.6 | — | — | — | 5 | — | — | — | — | — | — | — |
| SAc DS 1.3/laurate 9.1 | — | — | — | — | 5 | — | — | — | — | — | — |
| SAc DS 2.1/laurate 3.6 | — | — | — | — | — | 5 | — | — | — | — | — |
| SAc DS 2.1/laurate 3.2 | — | — | — | — | — | — | 5 | — | — | — | — |
| SAc DS 2.1/oleate 2.8 | — | — | — | — | — | — | — | 5 | — | — | |
| Estane | — | — | — | — | — | — | — | — | 10 | — | — |
| Ac/EVOH | — | — | — | — | — | — | — | — | — | 10 | — |
| Sorbitol trioleate ethoxylate | — | — | — | — | — | — | — | — | — | — | 1 |
| FOOTNOTES | c | d | d | a, d | c | d | a, d | a, d | d | d | d |

Legend

1) Aceplast LS is a cellulose acetate with substitution degree 2.5, traded by Societa acetati S.p.A. of Verbania, Italy.

2) CAB is a cellulose acetate/butyrate traded by Eastman chemicals under their trademark CAB 831–20.

3) The composition of both MAT-1 and MAT-2 products, obtained according to as reported in Italian patent application IT 67413/A89 is as follows:

| | MAT-1 | MAT-2 |
|---|---|---|
| Starch | 39 | 36 |
| ethylene-acrylic acid 20 | 3 | — |
| ethylene-vinyl alcohol | 36 | 22 |
| polyvinyl alcohol | — | 22 |
| Glycerol | 16.7 | 15.2 |
| Urea | 5 | 4.5 |
| Armid-E (the amide of eracic acid) | 0.3 | 0.3 |

4) Acetilated starch with DS=1.3 is manufactured by national Starch and is referred to as "78–0403 GDS-1233". Acetilated starch with DS=2 is a laboratory sample obtained in pyridine with acetic anhydride.

5) The compatibilizing agents reported in the Table were obtained from starch acetate (SAc) with SD 1.3 and 2.1 and cellulose acetate (CAc) with SD 2.1 The substitution percent rate is indicated as a suffix to the designation of the grafted acyl radical; it is expressed as the number of the resulting grafted radicals per each 100 monomeric units of substrate. The fatty acid grafting reaction was carried out using lauric and oleic acid chlorides in dimethyl acetamide. After neutralisation with pyridine, the compatibilizer agents deriving from starch acetate and cellulose acetate were precipitated with ethyl ether and water respectively.

6) Estane is a caprolactone/urethane copolymer traded by Goodrich as grade 54351.

7) AC/EVOH is a copolymer of cellulose acetate grafted with 10% of a copolymer of ethylene with vinyl alcohol. Cellulose acetate with SD of 2.9 is plastified in a monoscrew extruder OMC with 20 mm diameter, with 27% by weight of triacetin. The extruder was operated at 195° and 140 rpm.

The pellets were added with 1.3 w % of examethylendiamine disocyanate and extruded again at 170° C. and 140 rpm. The pellets thus obtained were added with 10w % of EVOH A4412 of Nippon Goshei and extruded at 180° C. and 6 rpm.

Footnotes to table 1

(a): the material was tested for biodegradability (see data reported in table 2;

(b): the dumbbell specimen, obtained by injection moulding operating according to above "B" condition, undergoes severe delamination;

(c): the dumbbell specimen, obtained by injection moulding according to above "B" operating condition, tends to delaminate;

(d): the morphology of the surface of the dumbbell specimen appears to be homogeneous, with no scales apparent.

Biodegradability of the Compositions Disclosed in the Examples

The biodegradability of the materials was tested by recording the weight loss of specimens enclosed inside polypropylene nets (with 1 mm mesh) embedded inside a substrate of an aged composite with 55% of moisture and heated at 50% inside an incubator. A plurality of specimen, i.e., one specimen each net, are charged, so as to able to follow the course of degradation over time. Per each specimens, 50 g of composite is used. The initial weight of the specimen is recovered, is washed in water and with ultrasounds at 20° C. and 55% RH, and is finally weighed.

TABLE 2

| | Weight loss undergone by specimens after | | |
|---|---|---|---|
| | 15 days | 60 days | 150 days |
| Example 1 | 18.6 | 23.1 | 26.3 |
| Example 2 | 15.8 | 19.6 | 24.8 |
| Example 3 | 18.8 | 24.1 | 25.8 |
| Example 5 | 29.8 | 39.1 | 51.7 |
| Example 6 | 32.1 | 84.7 | 91.2* |
| Example 7 | 25.2 | 86.3 | 93.2* |
| Example 9 | 30.1 | 89.8 | 96.9* |
| Example 10 | 27.1 | 85.9 | 97.1* |
| Example 15 | 29.8 | 86.7 | 98.0* |
| Example 18 | 30.4 | 88.8 | 97.4* |
| Example 19 | 29.2 | 91.1 | 97.5* |

*The found residue is black and its appearance is absolutely different from the appearance of the staring polymer. This is evidently material turned into humic type derivatives. Therefore, the indicated values can be regarded as being equivalent to 100% degradation.

Surface Morphology of Dumbbell Specimens

The inspection of the dumbbell specimens for their surface morphology was carried out by optical microscopy (Wild Macroscope M-420) and SEM electronic microscopy (Stereoscan 260 ex Cambridge Instruments). The optical microphotographs are in reflected light, with 45×magnification.

As may be observed from the picture, the addition of the compatibilizer according to the present invention causes a sharp increase in dumbbell specimen surface quality.

What is claimed is:

1. Biodegradable compositions which when injection molded provide homogeneous articles obtained by extrusion of a molten mass comprising (1) a starch or a starch ester or ether, (2) a cellulose ester or ether, (3) a plasticizer for the starchy phase and a plasticizer for the cellulose ester or ether phase, or a plasticizer for both phases, (4) water in an amount up to 20% by weight, and (5) a compatibilizing agent for the starchy phase and the cellulose ester or ether phase selected from groups (A) to (E) described below, wherein the molten mass is extruded under temperature and shear conditions to render the starchy phase and the cellulose ester or ether phase compatible with each other:

(A) polymers or copolymers compatible with the cellulose esters or ethers and/or with the starch or starch esters or ethers, grafted with aliphatic chains containing from 4 to 40 carbon atoms;

(B) copolymers obtained from hydroxy acids and/or diamines with 2–24 carbon atoms and aliphatic or aromatic diisocyanates or epoxy compounds and anhydrides; copolymers obtained from polyamides or polyureas and aliphatic or aromatic diisocyanates; copolymers obtained from aliphatic or aromatic diisocyanates and polyalkylene glycols;

(C) copolymers obtained from polymers compatible with cellulose esters or ethers and/or starch or starch esters or ethers, by grafting starch soluble polyols to the polymers compatible with cellulose esters or ethers and/or starch or starch esters or ethers;

(D) polymers capable of complexing starch selected from the group consisting of polyesters and polyamides;

(E) starch compatible polyols selected from the group consisting of monomers and polymers with a viscosity average molecular weight of less than 10,000.

2. The compositions according to claim 1, in which the ratio of starchy component to cellulose derivative, is from 1:90 to 90:1 by weight, and the compatibilizing agent is used in amounts from 1 to 20% based on the total amount of starchy components and the cellulose derivatives.

3. The compositions according to claim 1, in which the compatibilizing agent is selected from polymers or copolymers as set forth in class (A) and in which the grafting degree is within the range of from 0.1 to 30 grafted aliphatic chains per each 100 monomeric units in the polymer chain.

4. The compositions according to claim 1, in which the compatibilizing agent is a block copolymer obtained from polycaprolactone and aliphatic or aromatic diisocyanates.

5. The compositions according to claim 4, in which the copolymer is obtained from polycaprolactone and diisocyanates selected from the group consisting of 4,4'-diphenylmethane diisocyanate, toluidene diisocyanate, and hexamethylene diisocyanate.

6. The compositions according to claim 1, in which the compatibilizing agent of class (C) is a copolymer obtained by grafting, to the polymers compatible with cellulose esters or ethers and/or starch or starch esters or ethers, a polyol selected from the group consisting of polyvinyl alcohol, ethylene-vinyl alcohol copolymers, glycerol, polyglycerol, saccharides, trimethylol propane, and pentaerithritol.

7. The compositions according to claim 1, in which the cellulose ester is cellulose acetate with a substitution degree from 1.2 to 2.5.

8. The compositions according to claim 1, in which the plasticizer is present in amounts from 5 to 40% by weight, based on the total composition weight.

9. Biodegradable thermoplastic compositions comprising (1) a starch or a starch ester or ether, (2) a cellulose ester or ether, (3) a plasticizer for the starchy phase and a plasticizer for the cellulose ester or ether phase, or a plasticizer for both phases, and (4) a compatibilizing agent for the starchy phase and the cellulose ester or ether phase selected from described below wherein the melt is extruded under temperature and shear conditions to render the starchy phase and the cellulose ester or ether phase compatible with each other:

polymers or copolymers compatible with the cellulose esters or ethers and/or with the starch or starch esters or ethers, grafted with aliphatic or polyhydroxylated chains containing from 4 to 40 carbon atoms, in which the grafting degree is within the range of from 0.1 to 30 grafted aliphatic chains per each 100 monomeric units in the polymer chain, and in which the grafted chains present in the compatibilizing agent are obtained from animal or vegetable fats.

10. The compositions according to claim 9, in which the grafted chains are obtained from oleic, lauric, myristic, palmitic, stearic, erucic, linoleic, or ricinoleic acid.

11. Biodegradable compositions obtained by extrusion of a molten mass comprising (1) a starch or a starch ester or ether, (2) a polymer incompatible with starchy component (1) comprising a cellulose ester or ether, (3) a plasticizer for the starchy phase and a plasticizer for the cellulose ester or ether phase, or a plasticizer for both phases, (4) water in an amount up to 20% by weight, and (5) a compatibilizing agent for the starchy phase and the cellulose ester or ether phase selected from groups (A) to (E) described below, wherein the molten mass is extruded under temperature and shear conditions to render the starchy phase and the cellulose ester or ether phase compatible with each other:

(A) polymers or copolymers compatible with the cellulose esters or ethers and/or with the starch or starch esters or ethers, grafted with aliphatic chains containing from 4 to 40 carbon atoms;

(B) copolymers obtained from hydroxy acids and/or diamines with 2–24 carbon atoms and aliphatic or aromatic diisocyanates or epoxy compounds and anhydrides; copolymers obtained from aliphatic polyesters, polyamides or polyureas and aliphatic or aromatic diisocyanates; copolymers obtained from aliphatic or aromatic diisocyanates and polyalkylene glycols;

(C) copolymers obtained from polymers compatible with cellulose esters or ethers and/or starch or starch esters or ethers, by grafting starch soluble polyols to the polymers compatible with cellulose esters or ethers and/or starch or starch esters or ethers;

(D) polymers capable of complexing starch selected from the group consisting of polyesters and polyamides;

(E) starch compatible polyols selected from the group consisting of monomers and polymers with a viscosity average molecular weight of less than 10,000.

12. Biodegradable compositions obtained by extrusion of a molten mass comprising combining in an extruder (1) a starch or a starch ester or ether, (2) a cellulose ester or ether, (3) a plasticizer for the starchy phase and a plasticizer for the cellulose ester or ether phase, or a plasticizer for both phases, and (4) water in an amount less than 6% by weight, and (5) a compatibilizing agent for the starchy phase and the cellulose ester or ether phase selected from groups (A) to (E) described below, and extruding the molten mass under temperature and shear conditions that render the starchy phase and the cellulose ester or ether phase compatible with each other:

(A) polymers or copolymers compatible with the cellulose esters or ethers and/or with the starch or starch esters or ethers, grafted with aliphatic chains containing from 4 to 40 carbon atoms;

(B) copolymers obtained from hydroxy acids and/or diamines with 2–24 carbon atoms and aliphatic or aromatic diisocyanates or epoxy compounds and anhydrides; copolymers obtained from polyamides or polyureas and aliphatic or aromatic diisocyanates; copolymers obtained from aliphatic or aromatic diisocyanates and polyalkylene glycols;

(C) copolymers obtained from polymers compatible with cellulose esters or ethers and/or starch or starch esters or ethers, by grafting starch soluble polyols to the polymers compatible with cellulose esters or ethers and/or starch or starch esters or ethers;

(D) polymers capable of complexing starch selected from the group consisting of polyesters and polyamides;

(E) starch compatible polyols selected from the group consisting of monomers and polymers with a viscosity average molecular weight of less than 10,000.

* * * * *